(12) United States Patent
Haumonte

(10) Patent No.: US 9,188,692 B2
(45) Date of Patent: Nov. 17, 2015

(54) SEISMIC DATA ACQUISITION

(71) Applicant: KIETTA, Paris (FR)

(72) Inventor: Luc Haumonte, Marseilles (FR)

(73) Assignee: KIETTA, Paris (FR)

( * ) Notice: Subject to any disclaimer, the term of this patent is extended or adjusted under 35 U.S.C. 154(b) by 369 days.

(21) Appl. No.: 13/869,230

(22) Filed: Apr. 24, 2013

(65) Prior Publication Data

US 2013/0286773 A1    Oct. 31, 2013

(30) Foreign Application Priority Data

Apr. 25, 2012  (FR) ...................................... 12 53822

(51) Int. Cl.
*G01V 1/38*   (2006.01)

(52) U.S. Cl.
CPC ............ *G01V 1/3852* (2013.01); *G01V 1/3808* (2013.01); *G01V 1/3835* (2013.01); *G01V 1/3817* (2013.01); *G01V 2200/14* (2013.01); *G01V 2210/1212* (2013.01); *G01V 2210/16* (2013.01)

(58) Field of Classification Search
CPC .................................................... G01V 1/3852
See application file for complete search history.

(56) References Cited

U.S. PATENT DOCUMENTS

| | | | |
|---|---|---|---|
| 4,566,083 A | | 1/1986 | Thigpen |
| 4,715,018 A | * | 12/1987 | Blair ................................ 367/19 |
| 5,724,307 A | * | 3/1998 | Gaiser ............................. 367/21 |
| 5,774,417 A | * | 6/1998 | Corrigan et al. ................ 367/24 |
| 6,021,090 A | * | 2/2000 | Gaiser et al. .................... 367/15 |
| 6,205,403 B1 | * | 3/2001 | Gaiser et al. .................... 702/14 |
| 6,474,254 B1 | * | 11/2002 | Ambs et al. ................... 114/312 |
| 6,932,185 B2 | * | 8/2005 | Bary et al. ..................... 181/122 |
| 7,203,599 B1 | * | 4/2007 | Strack et al. ..................... 702/2 |
| 7,239,577 B2 | | 7/2007 | Tenghamn et al. |
| 7,742,876 B2 | * | 6/2010 | Robertsson .................... 702/17 |
| 7,898,904 B2 | * | 3/2011 | Arnegaard et al. ............. 367/76 |
| 7,965,583 B2 | * | 6/2011 | Thomas .......................... 367/16 |
| 8,416,640 B2 | * | 4/2013 | Fleure et al. ................... 367/56 |
| 8,576,658 B2 | * | 11/2013 | Thomas .......................... 367/15 |
| 2002/0172562 A1 | * | 11/2002 | Worman et al. ............... 405/161 |
| 2004/0049347 A1 | * | 3/2004 | Fookes et al. .................. 702/14 |

(Continued)

FOREIGN PATENT DOCUMENTS

| | | |
|---|---|---|
| GB | 2414804 A | 12/2005 |
| WO | 01/79890 A1 | 10/2001 |

(Continued)

*Primary Examiner* — Ari M Diacou
(74) *Attorney, Agent, or Firm* — Norton Rose Fulbright US LLP

(57) ABSTRACT

A method is proposed for acquiring seismic data relative to an area of the subsoil, wherein at least one seismic source is moved and seismic waves are emitted in successive shooting positions of the source so as to illuminate said area of the subsoil, and the signals resulting from this emissions are picked up using a set of cables having a substantially zero buoyancy and provided with receivers. The cables have a substantially zero speed or a speed substantially slower than the source in the terrestrial reference frame. And said successive shot positions are determined as a function of the position of the receivers relative to the terrestrial reference frame to optimize at least one quality criterion relating to the set of seismic signals acquired by the receivers in respect of said area. Such a method enables improved seismic data acquisition.

12 Claims, 6 Drawing Sheets
(2 of 6 Drawing Sheet(s) Filed in Color)

(56) References Cited

U.S. PATENT DOCUMENTS

| | | | |
|---|---|---|---|
| 2005/0052951 A1* | 3/2005 | Ray et al. | 367/188 |
| 2006/0155758 A1* | 7/2006 | Arnegaard et al. | 707/103 X |
| 2006/0256652 A1* | 11/2006 | Thomas | 367/15 |
| 2008/0010022 A1* | 1/2008 | Robertsson | 702/17 |
| 2009/0046536 A1* | 2/2009 | Kinkead | 367/21 |
| 2009/0316524 A1* | 12/2009 | Tenghamn | 367/16 |
| 2010/0265793 A1* | 10/2010 | Fleure et al. | 367/20 |
| 2011/0149682 A1* | 6/2011 | Martin et al. | 367/19 |
| 2011/0283797 A1* | 11/2011 | Manin | 73/584 |
| 2011/0291658 A1* | 12/2011 | Skogman et al. | 324/337 |
| 2012/0287753 A1* | 11/2012 | Hatchell et al. | 367/21 |
| 2014/0046599 A1* | 2/2014 | Smith et al. | 702/14 |
| 2014/0198607 A1* | 7/2014 | Etienne et al. | 367/15 |
| 2014/0254315 A1* | 9/2014 | Rigsby et al. | 367/15 |
| 2015/0063064 A1* | 3/2015 | van Groenestjin | 367/21 |

FOREIGN PATENT DOCUMENTS

| | | |
|---|---|---|
| WO | 02/073238 A2 | 9/2002 |
| WO | 2010/076646 A1 | 7/2010 |
| WO | 2011/154545 A2 | 12/2011 |

* cited by examiner

SEISMIC DATA ACQUISITION

CROSS-REFERENCE TO RELATED APPLICATIONS

This application claims priority from Application 12 53 822 filed on Apr. 25, 2012 in France.

TECHNICAL FIELD

The present invention relates to the field of marine seismic data acquisition.

BACKGROUND OF THE INVENTION

Documents WO 2010/076646 and WO 2011/154545 in particular describe seismic data acquisition methods relative to an area of the subsoil in the marine environment using a set of cables provided with receivers (seismic sensors), all of the receivers forming a seismic network, and at least one seismic source. The seismic source moves relative to the cables and emits seismic waves in successive shot positions of the source so as to illuminate said area of the subsoil, and the receivers pick up the reflected waves resulting from those emissions. The cited documents describe an acquisition mode in which the cables are kept stationary or quasi-stationary relative to the terrestrial reference frame, or move relative to that reference frame at a speed substantially lower than that of the source. In that type of acquisition, the currents exert a significant influence on the cables, and therefore on the position of the receivers, which may affect the quality of the seismic data acquired by the receivers.

There is therefore a need for a seismic data acquisition method making it possible to compensate the effect of the currents.

To that end, the present invention proposes an acquisition method of seismic data relative to an area of the subsoil. In the method, at least one seismic source is moved and seismic waves are emitted in successive shot positions of the source so as to illuminate said area of the subsoil. The signals resulting from those emissions are picked up using a set of cables having a substantially zero buoyancy and provided with receivers. The cables have a substantially zero speed or a speed substantially slower than the speed of the source in the terrestrial reference frame. Said successive shot positions are determined as a function of the position of the receivers relative to the terrestrial reference frame so as to optimize at least one quality criterion relating to the set of seismic signals acquired by the receivers in respect of said area.

BRIEF SUMMARY OF THE INVENTION

According to preferred embodiments, the invention comprises one or more of the following features:
the shot positions are calculated one by one;
the shot positions are calculated in a grouped shot;
the shot positions are adjusted within a predetermined interval range between consecutive shot positions;
the positions of the receivers are determined from the absolute positions of the ends of the cables obtained using GPS antennas and relative positions of the receivers with respect to said ends obtained using acoustic triangulation networks installed in the cables;
the ends of the cables are provided with drones moving the cables while keeping them under tension, the acoustic triangulation networks comprising acoustic positioning units installed under the drones;
the shot positions of the seismic source are determined as a function of a provided reference position of the receivers and the calculation of a drift of the seismic cables by comparing the actual position of the receivers to the reference position of the receivers;
the shot positions follow at least one shot line;
the arrangement of the shot lines is modified relative to the initial arrangement; and/or
the quality criterion is chosen from among a criterion relative to compliance with the geometry of the midpoints, to compliance with a regular distribution of the offsets or the azimuths, or a composite criterion.

The present invention also proposes a marine seismic acquisition system suitable for implementing the method.

For example, the system comprises a source boat suitable for moving at least one seismic source. The seismic source is adapted to emit seismic waves. The system also comprises a set of cables having a substantially zero buoyancy and provided with receivers. The ends of the cables are provided with drones suitable for keeping the cables at a speed in the terrestrial reference frame which is substantially zero or substantially lower than that of the source. The system also comprises a master boat. The master boat is adapted to receive information from the drones on the position of the receivers relative to the terrestrial reference frame. The master boat is also able to determine said successive shot positions as a function of the position of the receivers (106) relative to the terrestrial reference frame to optimize at least one quality criterion relating to the set of seismic signals acquired by the receivers. The master boat is also able to send said successive shot positions to the source boat. The source boat can then move the seismic source, which can emit seismic waves in the successive shot positions so as to illuminate an area of the subsoil.

BRIEF DESCRIPTION OF THE DRAWINGS

The application file contains four figures executed in color. Copies of this patent application publication with color drawings will be provided by the Office upon request and payment of the necessary fee. Other features and advantages of the invention will appear upon reading the following description of one preferred embodiment of the invention, provided as an example and in reference to the appended drawing.

DETAILED DESCRIPTION OF THE INVENTION

Figure 1:
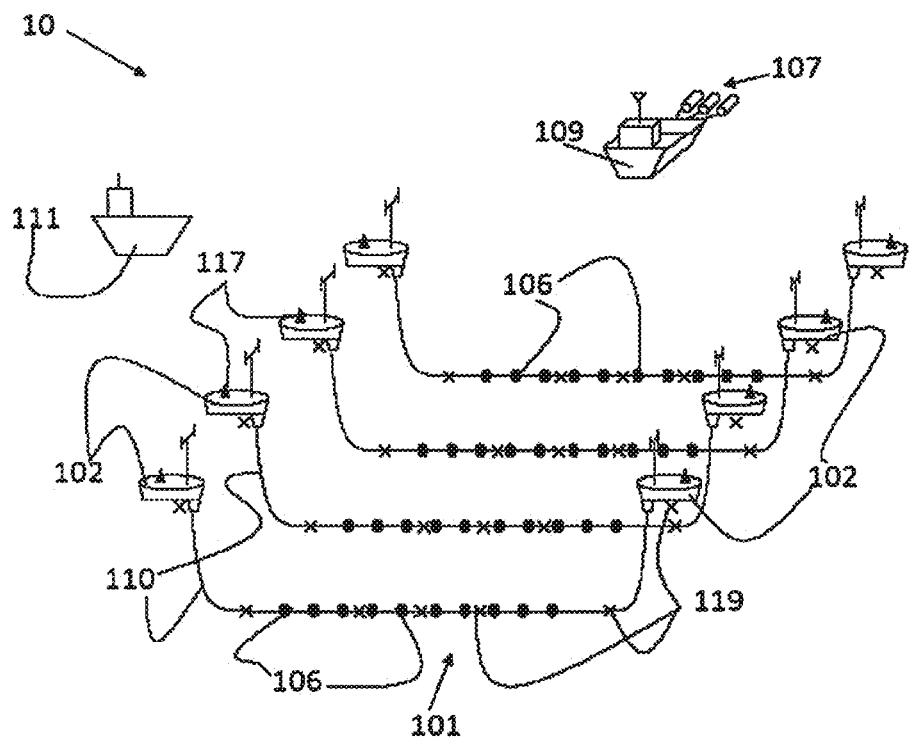
FIG. 1 shows a perspective view of a seismic acquisition system.

FIG. 1 shows a marine seismic acquisition system 10. The system 10 comprises a set 101 of parallel seismic cables 110, according to the teaching of document WO 2010/076646 and/or document WO 2011/154545 and suitable for implementing the method, and a seismic source 107 towed by a source boat 109. Each cable 110 of the set 101 has a substantially zero speed in the terrestrial reference frame, or in any case slower than that of the source 107, a typical value for the speed of the source being approximately 5 knots. Thus, the traditional solutions of cables towed by a boat at a relatively high speed are excluded from the method. In particular, the cables 110 can be kept in a stationary or quasi-stationary position, or have a speed in the terrestrial reference frame, in absolute value, lower than two times the speed of the source 107, preferably three, four, six or ten times.

Control units make it possible to keep the speed of the cables 110 in the terrestrial reference frame substantially nil, or in any case substantially lower than that of the source 107. In the illustrated example, each cable 110 is connected at its ends to independent vehicles or "drones" 102 suitable for moving the cable 110 and keeping it under tension, and which incorporate such a control unit. The control unit is a system comprising a processor coupled to a random-access memory, and implementing a program comprising instructions for controlling the speed of the cable 110. For example, the control unit can minimize the deviation of the cable 110 relative to a desired route in the terrestrial reference frame (the route being a trajectory in the terrestrial reference frame that is predetermined and to be followed at a speed substantially slower than that of the source), the movement of the cable 110 also possibly being restricted by a maximum curvature value of the path in the water (which makes it possible for the cable 110 to keep a smooth shape satisfactory for a geophysicist, and to undergo fewer stresses, and to be compatible with the control of several cables). Thus, the control unit minimizes such a deviation, for example in real-time, using predetermined data in the program, such as the desired route and/or a maximum deviation restriction and/or a maximum curve restriction. Documents WO 2010/076646 and WO 2011/154545 in particular describe such movements of the cable 110.

In this context where the cables 110 have a speed in the terrestrial reference frame that is substantially lower than that of the source, the receivers can move away from the optimal position (i.e., the position of the desired route where the cable 110 should be situated on an instantaneous basis, or a fixed position in the terrestrial reference frame in the stationary or quasi-stationary case). In fact, the cables 110 are subject to the influence of the current, and since they are typically several kilometers long, they drift relative to the desired position.

There is thus a risk that the cables 110 will not remain stationary or will not follow the desired trajectory. In such a case, emitting seismic waves at regular intervals (for example, such that the shot positions form a grid of uniformly distributed points), as is generally the case in the prior art, results in a non-optimal seismic data acquisition. In fact, the cables 110 may shift from one shot to the next, and not taking that shift into consideration is detrimental to the acquisition.

In the method described below, the successive shot positions are determined as a function of (actual instantaneous) positions of the receivers 106 relative to the terrestrial reference frame to optimize a quality criterion, which may be composite, relating to the seismic signals acquired by the receivers.

In other words, one determines a quality criterion relating to the seismic signals acquired by the receivers 106, i.e., a seismic criterion that one wishes to respect as much as possible for the signals. This quality criterion may be given as is conventional by a geophysicist with prior knowledge of the study area, as a function of his goals for the data acquisition, and relates to the set of seismic signals acquired in respect of the study area, and its value (i.e., the extent in which the quality criterion is respected) depends on the position of the receivers 106 relative to the terrestrial reference frame and the shot positions that will be determined. It should be noted that the quality control data (QC data) is provided by commercial programs. Various examples of such a quality criterion will be provided later.

One therefore then acts on the successive shot positions to optimize the quality criterion, taking the actual position of the receivers 106 into account. Suitably, the shot positions may be adjusted within a predetermined interval range between consecutive shot positions. Thus, the gap between two shot positions never exceeds the size of the range, but is nevertheless adjusted within the range instead of being fixed, so as to optimize the targeted quality criterion.

The positions of the receivers 106 can be determined using an onboard positioning system comprising GPS antennas 117 on the drones 102 providing the absolute position of the drones, and acoustic positioning units 119 (forming "acoustic triangulation networks") in the form, in the example of the Figure, of a network of acoustic transceivers installed under the drones 102 and along the cables 110 that provide the relative positions of the receivers 106 with respect to the drones 102, and possibly other additional information from compasses and depth gauges. The absolute position of the receivers 106 is deduced from the absolute position of the drones 102 and the relative position of the receivers 106 with respect to the drones 102. It should be noted that different types of acoustic positioning units 119 exist. These may be transmitters and/or receivers. In other words, the units may be only receivers or only transmitters, and they may also combine both functions at once.

As previously indicated, under the influence of the current, the receivers 106 can deviate from the predetermined route or from a predetermined stationary position in the terrestrial reference frame. It is then possible to determine the actual position of the receivers 106 thanks to that integrated positioning system that is traditional in the industry and to use that data directly during optimization of the quality criterion to determine, in that case in real-time, the shot positions of the source 107.

The shot positions of the seismic source 107 can then be determined as a function of a provided reference position of the receivers 106 and the calculation of a drift (i.e., a deviation) of the seismic cable 110 by comparing the actual position of the receivers 106 to the reference position of the receivers 106. The drift therefore corresponds to the deviation between the actual position of a receiver 106 and its theoretical position. In other words, the absolute actual position of the receivers 106 is not used as such when determining the shot positions in this example; it is instead another piece of information that depends thereon, i.e., the drift of the seismic cable 110, that is used in the computer implementation of the determination.

The shot positions can follow shot lines passing above the seismic cables 110. This is described in document WO 2010/046646. The determination of the shot positions of the source 107 can be done at the end of a travel of a predetermined number of lines by the source 107, for example 1 for a good compromise between optimization of the quality criterion and calculation costs, as a function of the magnitude of the current, for example the current measured or estimated during a previous iteration of the method, so as to account accurately for the drift of the cable 110 due to the current. The seismic source 107 can alternatively follow more complex trajectories. For example, the seismic source 107 can follow a spiral trajectory. The lines followed by the seismic source 107 may also not cross the cable 107, for example being parallel thereto.

The quality criterion is suitably a criterion relating to the set of seismic signals acquired by the receivers in relation to the study area. Such criterion is more particularly a criterion relating to the acquisition geometry corresponding to such set of seismic signals. This criterion is suitably chosen from among a criterion relative to compliance with the geometry and content of the bins (the midpoints), complying with a distribution of the offsets or azimuths, or may be a composite criterion combining those criteria.

The midpoints are the middles of the segment having the position of the source 107 in a given shot position and the actual position of the receiver 106 for ends. A criterion relative to compliance with the midpoints may consist of ensuring that the midpoints between the shot position of the seismic source 107 and the actual position of the receivers 106 are uniformly distributed in the terrestrial reference frame. Optimizing such a criterion therefore means bringing such a uniform distribution of the midpoints as close as possible, or perfectly, into line with an acquired data set.

Alternatively or additionally, the quality criterion can incorporate a criterion for compliance with a regular distribution of the offset and/or azimuth content of all of the bins. The offset of a shot is the distance between the source and the receiver 106 when the source 107 emits a wave. The azimuth is the angle, from the perspective of the receiver, of the receiver-source vector. Such a criterion may for example consist of ensuring that the shot positions of the seismic source 107 are uniformly distributed in a reference related to the seismic cable 110.

A composite criterion is a criterion implementing the various criteria with different weights.

FIG. 1 shows the set 101 of cables 110 provided with a plurality of receivers 106 (for example hydrophones or geophones) capable of collecting said reflected waves. Such a cable 110 may be called a "seismic cable", or a "seismic streamer". The cables 110 evolve in a measurement station adapted to prospect part of the aforementioned area of the subsoil. The seismic source 107 is triggered. The receivers 106 are used to pick up the reflected waves. It is then possible to move to another measuring station adapted to prospect another part of the aforementioned area, on the one hand the cables 110 and on the other hand the seismic source 107, and so forth. The cables 110 have a substantially zero buoyancy and are submerged at a depth (i.e., the distance relative to the surface of the water). Appropriately, the depth of the cables 110 may be situated between the minimum value to allow passage of the seismic source 107 above the cables 110s, i.e. at least 5 m, and approximately 100 m. Each of the cables 110 is suitably provided with ballast-forming elements designed to keep the cable 110 submerged. The ballasts allow the cables 110 to keep their depth substantially constant and to vary it in a controlled manner. Each of the cables 110 is also provided at both ends thereof with surface drones 102 in the example of FIG. 1, capable of moving the cables 110 (in the water, so they are stationary, quasi-stationary, or do not move too far from the desired route in the terrestrial reference frame) and keeping each cable 110 under tension. Documents WO 2010/076646 and WO 2011/154545 describe the use of a set 101 of such cables 110 arranged in parallel and forming a grid of receivers above the area of the subsoil being studied. The drones 102 cooperate to keep the set 101 of cables 110 under tension and parallel, while the seismic source 107 passes above the cables 110 and shoots in the various determined shot positions.

Figure 2:
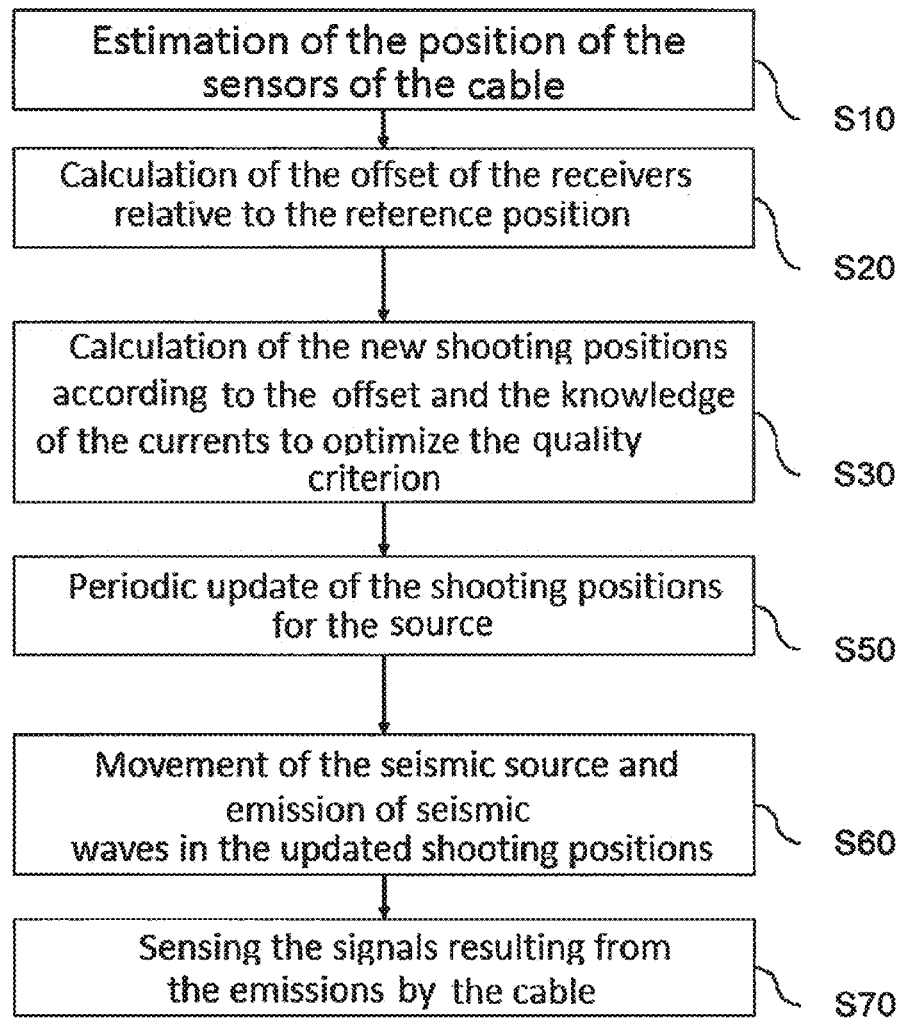
FIG. 2 shows one example embodiment of the method.

FIG. 2 shows an example implementation of the method, for example with the set 101 of cables 110 and the seismic source 107 of FIG. 1. The method of the example first comprises an estimate S10 of the (actual) position of the receivers of the cables. This estimate may be done using the positioning system described above. The method then comprises calculating S20 the drift of the receivers relative to a reference position (fixed position in the terrestrial reference frame in the quasi-stationary case, or instantaneous position of a slow trajectory in the terrestrial reference frame). The method also comprises calculating (S30) new shot positions as a function of the drift and the knowledge (past, present and/or future) of the currents to optimize the quality criterion. Since the drift is related to the position of the receivers, this calculation is done, in other words, as a function of the position of the receivers. In the example, the knowledge of the currents may consist of an estimate of the current for the next shot series. In this way, it is possible to estimate the future drift undergone by the cable and further optimize the quality criterion.

Steps S10, S20 and S30 thereby make it possible to determine the successive shot positions as a function of the position of the receivers relative to the terrestrial reference frame to optimize at least the quality criterion of the seismic signals acquired by the receivers. The new shot positions thus determined are used to update S50 the future shot positions (e.g., stored in a buffer of the control unit of the source). The method according to the example therefore next comprises moving S60 the seismic source in the new shot positions and emitting seismic waves in those positions, and lastly capturing (i.e. picking up/sensing) S70 the signals resulting from the emissions by the receivers of the cables.

Examples of the method and its results will now be described in reference to FIGS. 3 to 8.

X denotes the direction of the average current, and Y denotes the direction perpendicular to X in the horizontal plane. The cables 30 are aligned along X and cannot rapidly compensate the deviation relative to a target position (i.e., a desired theoretical position, e.g., stationary) in the direction Y. This means that when a current is present that is variable over time (for example, a constant current to which a tidal current is added), the cables 30 are subject to a drift (relative to the target position) on the axis Y that cannot be compensated. In other words, the cables 30 act as a filter, and the positioning of a cable 30 cannot compensate the "rapid" variations of the current ("rapid" being relative to the time constant of the system, which mainly depends on the length of the cables and the speed of the current). Depending on the profile of the current, deviations may also exist on the axis X (in particular in the presence of a circular current when the trajectory of the current forms a loop smaller than or of similar size to the length of the cable).

We will now describe an example of the method that aims to maximize the coverage of the midpoints while compensating the effects of the current. In other words, the quality criterion of the method of the example relates to compliance with the midpoints, and precisely consists of ensuring that the midpoints between the shot positions of the seismic source and the actual position of the receivers are uniformly distributed in the terrestrial reference frame (i.e., the midpoints form a uniform grid of points). The midpoints are situated at the middle of the segment formed by each shotpoint and each receiver. By adopting the complex notation to indicate a 3D position projected in a horizontal plane, for example the surface of the sea (e.g., the real part corresponds to the longitude and the imaginary part to the latitude), if $z_S$ is the complex number denoting the position of the source point, and $z_R$ is the complex number denoting the position of a receiver, the complex number denoting the position of the midpoint is given by $z_M=(z_R+z_S)/2$. Furthermore, in the example, the source follows shot lines (m−1, m) orthogonal to the direction of the cables 30 (therefore following the direction Y).

Let i denote the index of the cables 30, and k the index of each receiver 32 or group of receivers along the cable k. The midpoint of the shotpoint s and the receiver k belonging to the cable i is denoted: $z_M(i,k,s)=(z_R(i,k)+z_S/2)$. Following the explanation provided above, the real part of $z_R(i,k)$—along the direction X—is relatively easy to control, while the imaginary part of $z_R(i,k)$—along the direction Y—is not truly controllable and is constrained by the residual current variation.

The position of the source is completely free. The method makes it possible to compensate unwanted variations in the position of the receivers by adapting the position of the shotpoints. More specifically, the method proposes shooting at a specific location such that the midpoints (on average or in absolute value) fall exactly where they should have been without any current.

Figure 3:
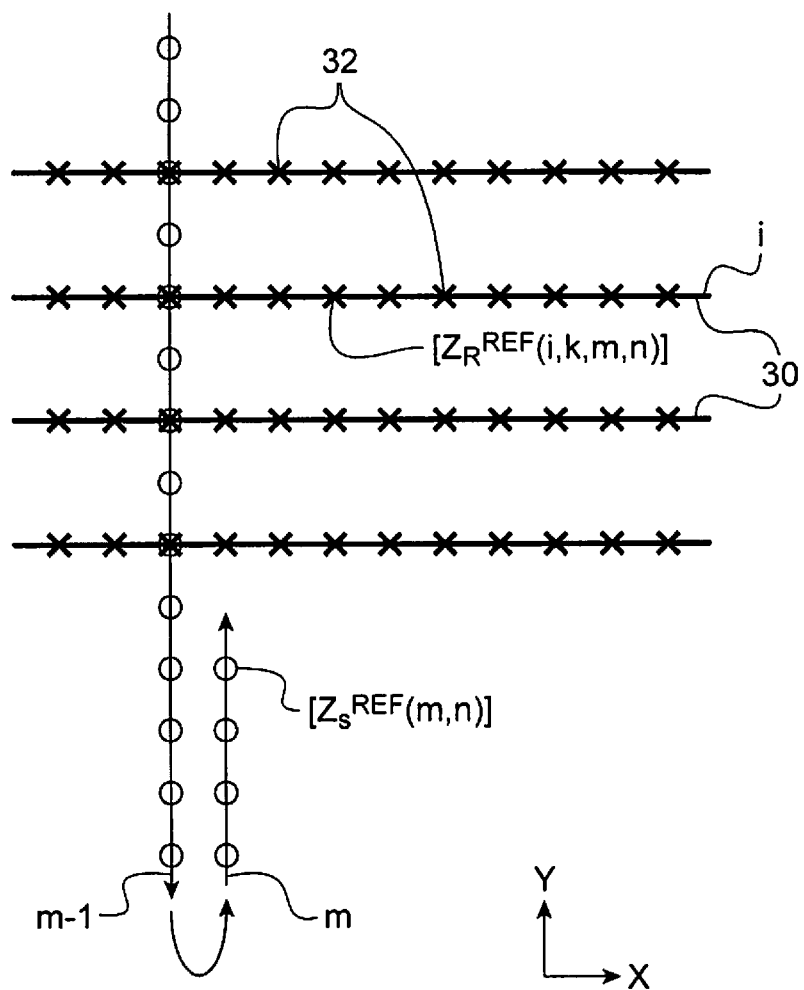
FIGS. 3 and 4 illustrate examples of the method.

The theoretical case where there is no current is illustrated in FIG. 3. Let dc denote the distance between the cables 30 (for example, 400 m), and $d_r$ the space between the receivers 32 (for example, 25 m), or group interval. Let us consider an orthogonal shot geometry resulting in a square pixel CMP:

Spacing between shotpoints=$d_r$ (for example, 25 m);
Spacing between shot lines=$d_c$ (for example, 400 m);
Shot margins in directions X and Y (for example, exceeding the length of the cable on each side by 50%).

Let $z_S^{REF}(m,n)$ denote the $n^{th}$ shotpoint of the shot line m. Without current, the cables 30 are exactly in the desired position $z_R^{REF}(i,k,m,n)$. The positions of the reference midpoints are denoted: $z_M^{REF}(i,k,m,n)=(z_R^{REF}(i,k,m,n)+z_S^{REF}(m,n))/2$. It will be noted that if the cables 30 are commanded to be completely stationary (and not following a low-speed itinerary), the positions of the receivers 32 are constant: $z_R^{REF}(i,k,m,n)=z_R^{REF}(i,k)$.

Figure 4:
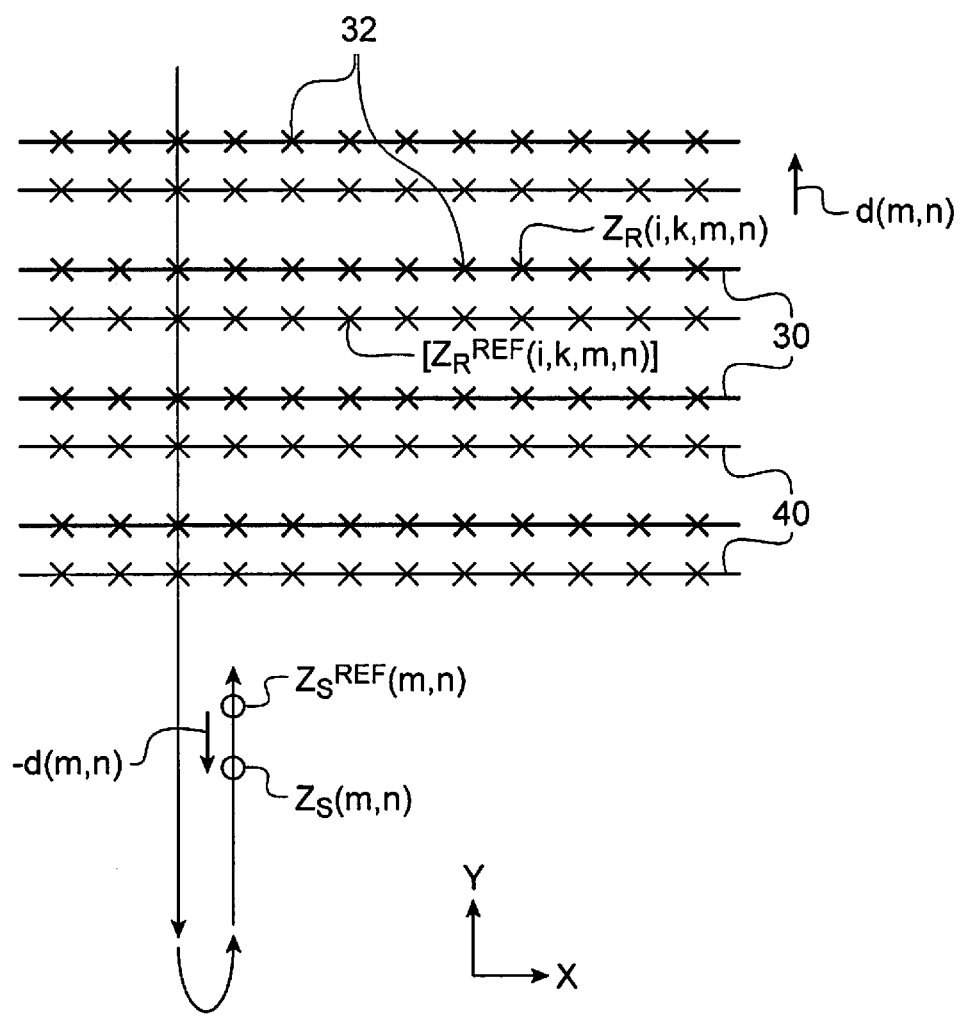

The real case where there is a current is illustrated in FIG. 4. In the presence of the current, and assuming the same shot sequence, the proposed method operates as follows: the source boat shoots at the position $z_S(m,n)=z_s^{REF}(m,n)-d(m,n)$, where d(m,n) is a complex number representing the offset of the cables 30 relative to the target point when the source boat is about to shoot the $n^{th}$ point of the $m^{th}$ shot line.

Thus, in the case of a uniform drift of the cables 30 (i.e., the cables 30 are all translated by the same translation vector, the result of the translation being referenced 40 in the Figure), the midpoints fall exactly where they would have fallen had there been no current. In fact, upon the $n^{th}$ shot of the shot line m, the position of the receivers is given by:

$$z_R(i,k,m,n)=z_R^{REF}(i,k,m,n)+d(m,n).$$

The position of the midpoints is therefore given by:

$$\begin{aligned}Z_M^{REF}(i,k,m,n) &= (z_R(i,k,m,n)+z_S(m,n))/2 \\ &= (z_R^{REF}(i,k,m,n)+d(m,n)+z_S^{REF}(m,n)-\\ &\quad d(m,n))/2 \\ &= (z_R^{REF}(i,k,m,n)+z_S^{REF}(m,n))/2 \\ &= z_M^{REF}(i,k,m,n)\end{aligned}$$

Figure 5:
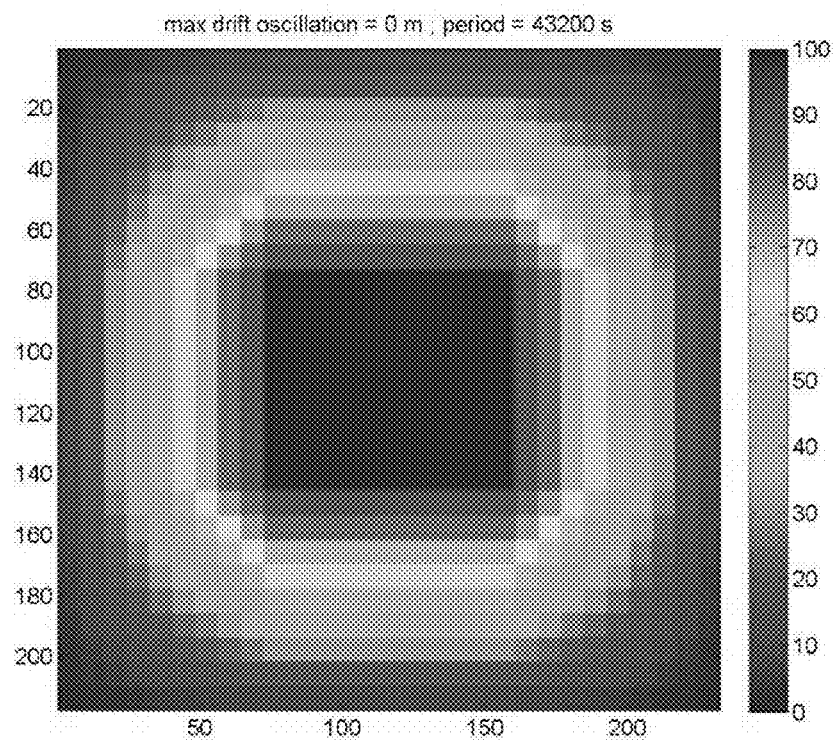
FIGS. 5 to 8 illustrate color examples of the method.
Figure 6:
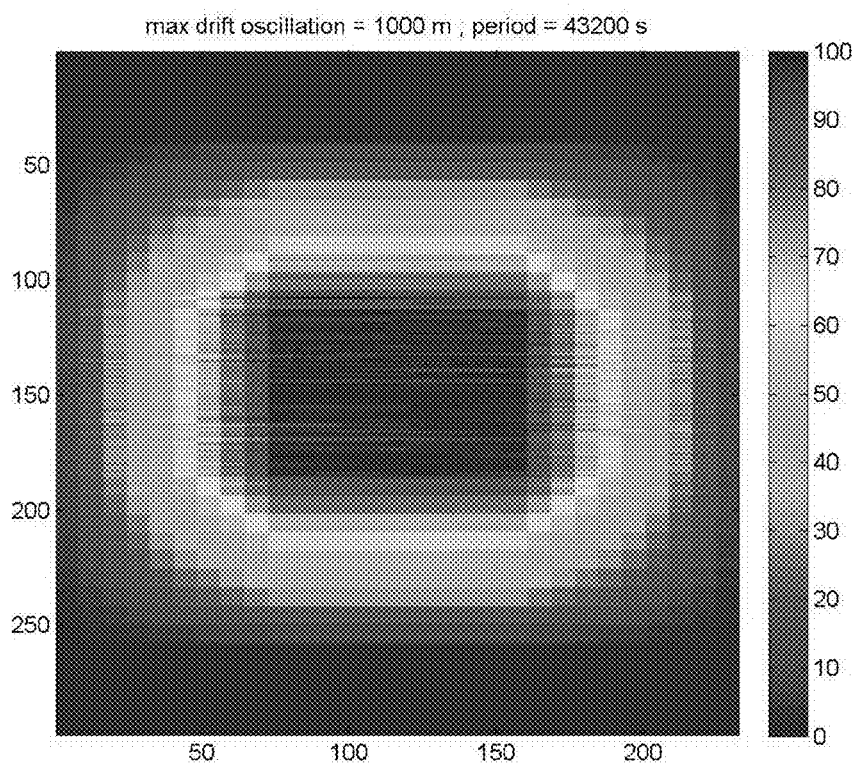

In that case, all of the seismic energy is kept exactly at the reference midpoints, and no dispersion appears in the neighboring positions, as illustrated by FIGS. 5 and 6.

FIG. 5 shows a (simulated) coverage map in the theoretical case where there is no current (case presented in reference to FIG. 3). The Figure shows the seismic energy (i.e., the received seismic shot density per 12.5 m×12.5 m pixel on a 1:100 scale). As one can see, a good seismic density is obtained for a central square, and therefore good quality of the seismic data, which is little dispersed.

FIG. 6 shows a map under the same conditions as FIG. 5, but obtained with a sinusoidal current (in the direction Y) with a maximum amplitude of 1000 m and a period of 43,200 seconds, and applying the method, i.e., determining the shot positions to optimize the quality criteria and relative to compliance with the midpoints, i.e., their uniform distribution.

FIG. 6 shows that the method according to the invention makes it possible, similarly to the theoretical case, where there is no current, to obtain good seismic energy for a central square, thereby minimizing dispersions.

Figure 7:
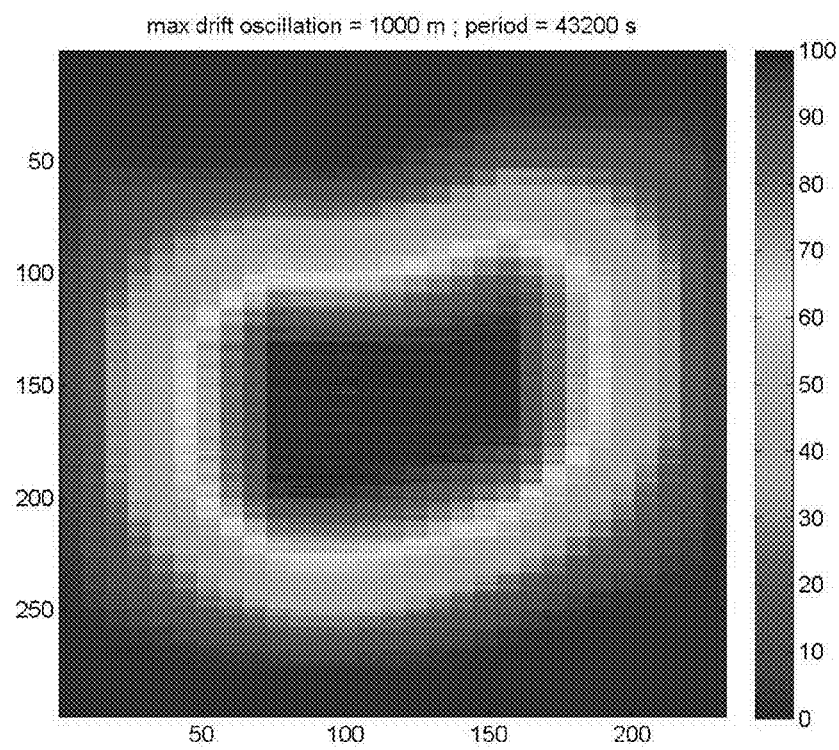

FIG. 7 shows a map under the same conditions as FIG. 6, but the method is not applied. Instead, the shot positions form a uniform grid in the terrestrial reference frame. This Figure shows that there is a dispersion of the seismic energy compared to the case of FIG. 6, where the method is applied.

The method may be extended in the case of a non-uniform translation of the cables. The offset d(m,n) may be estimated by considering the offset from the (geometric) center of gravity of the set of cables. Thus, the seismic energy remains concentrated around the center of the reference midpoints, and the dispersion outside the reference midpoints is minimized.

Using the same principle, the method may be directly extended in the case of a change of the azimuth of the cables (for example, due to a change in direction of the average current).

The method may be used with any shot geometry. The orthogonal shot geometry is provided as an example. A zigzag, circular, or parallel shot geometry may be used.

In the event the drift is large for the dimension of the cable network, the method may lead to significant distances between the source and receivers (offset), and may deteriorate the offset/azimuth distribution. An alternative to the quality criteria and relative to compliance with the midpoints is therefore to optimize the coverage of the midpoints while restricting the maximum value of the offsets. Reducing the offset automatically positions the source boat closer to the receivers, the negative effect being the spreading of the seismic energy around the reference midpoints.

Figure 8:
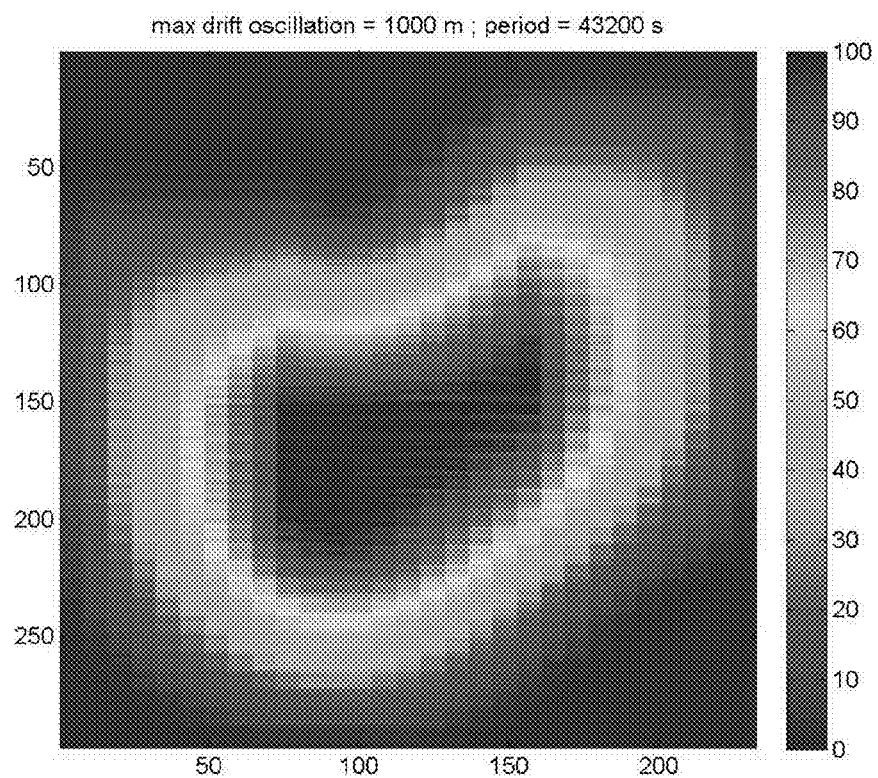

FIG. 8 shows a map under the same conditions as FIG. 6, but the quality criterion used is different from that of FIG. 6. In the case of the simulation of FIG. 8, the quality criteria relates to compliance of the offsets and azimuths of the shots, and more specifically, the shot positions of the seismic source are uniformly distributed in the reference frame related to the cable. One can see that the seismic energy is dispersed, but that is not important in this case, as the selected quality criterion is different.

It is possible to use a compromise lying between minimizing the energy dissipation and limiting large offsets. Similarly, the optimization may be restricted on the azimuth values. More generally, several additional elements may be used to decide on the best shot position, such as navigational quality control, seismic quality control, and data post-processing. The ultimate goal is to optimize the overall coverage and maximize the illumination of the geological target. Instead of optimizing the coverage of the midpoints, the optimization criterion may be to optimize the distribution of (transmitter-receiver) pairs.

The optimization of the quality criterion will now be described in general. The optimization problem may be formulated as follows.

First, this may be a criterion one wishes to maximize or minimize. For example, one may wish to maximize the coverage of the area being studied, or minimize the distance between the desired coverage and the actual coverage. The maximization problem and the minimization problem may be formulated equivalently, without any impact on the overall optimization process. In general, we will consider hereafter that one wishes to minimize a metric (i.e., quality criterion) denoted M corresponding to one or more geophysical quality criteria.

The formulation of this metric depends on various factors related to the intrinsic characteristics of the acquisition system and its deployment (number of cables, number of sources, spacing of the receivers, spacing of the shot lines, shot margins, etc.) and the goals of the geophysical studies to be conducted (desired coverage level, azimuth richness, offset distribution, etc.).

Thus, to optimize the coverage of the midpoints, the metric may include a criterion related to the number of traces at each of the midpoints. To impose close or distant offsets, the criterion may account for the distribution of the offsets. To optimize the rose diagram, the criterion may account for the joint offset/azimuth distribution. To maximize the signal-to-noise ratio, the criterion may take a measurement of the noise into account. All of these components may be considered individually or in combination with more or less weighting in the overall metric M.

Concretely, the metric may be calculated from data provided in real-time by the seismic quality control tools present onboard the seismic vessels. The metric may consist of comparing the desired values of quality indicators with the actual values of quality indicators (the actual values may account for results already obtained and future values based on predictions).

For example, if one wishes for the number of traces at each of the midpoints to follow a specific distribution, the metric may be equivalent to:

$$\sum_{p \in P} |N_p - D_p|$$

Where: P is the set of bins ("pixels") to be considered for the study, p is an index that runs over all of the bins, $N_p$ is the number of traces actually obtained in the bin p, and $D_p$ is the number of traces desired in the bin p.

If one wishes to have a uniform distribution of traces within the bins ($D_p$=D), the equation is simplified as follows:

$$\sum_{p \in P} |N_p - D|$$

Obviously, the same type of formulation can be used for offset and azimuth distributions.

The metric can also use simple and direct criteria without necessarily using the specific value of the seismic quality indicators. For example, if one wishes to reduce the noise level, in particular the flow noise, it is possible to introduce a term proportional to the speed of the currents squared, instead of using an exact noise measurement (which will include all of the contributions to the total noise).

In order to describe the optimization method, we will consider here that the metric only depends on the position of the reception points, the position of the shot points, and the currents. In fact, we assume that all of the other parameters figuring into the formulation of the metric are known before the study and remain constant throughout the study.

Thus, the metric can be denoted M(S,R,C), where S denotes the positions of the sources (complex numbers), R the positions of the receivers (complex numbers), and C the value of the speed of the currents (field of complex numbers), all of these parameters depending on the time t.

We also assume that the value of the currents and the value of the positions of the receivers are known. Thus, simply, the optimization of the problem leading to the calculation of the shot positions can be formulated as follows:

$$\hat{S}_0 = \underset{S}{\mathrm{argmin}} E[M(S, R, C) | R, C]$$

The letter E represents the mathematical expectation since the criterion must be minimized statistically, all of the variables depending on time (S, R and C are considered to be random variables).

It should be noted that the uniqueness of $\vec{S}_0$ is not necessarily guaranteed.

The optimization method is generally restricted, for example obviously by the maximum speed of the source-boat:

$$\left|\frac{\partial s}{\partial t}\right| < v_{smax}$$

In practice, the source-boat may also be limited in terms of heading changes, which imposes a maximum limit on the curvature of the parametric curve s(t).

The choice of the algorithm and its implementation generally depends on the formulation of the metric M. The optimization algorithm may be chosen from all of the optimization algorithms existing and known by those skilled in the art. Once the metric is quantified and can be calculated, the traditional numerical optimization methods, such as the gradient algorithm, can be used. It should be noted that the resolution of the optimization problem may be approached differently (in particular depending on the expression of the metric M) and generally does not allow a single optimal solution.

If the metric itself does not depend on the current, but the positions of the receivers do depend on the current—which are then denoted R(C)—one seeks to minimize:

$$E[M(S, R(C)) | R(C)] \stackrel{def}{=} E[M(S, R) | R]$$

We will now develop a concrete example of optimization seeking to minimize the deviation between the actual coverage of the midpoints and the desired coverage. The expectation is estimated using the empirical average:

$$E[M(S, R) | R] = \frac{1}{\mathrm{card}(P)} \cdot \sum_{p \in P} |N_p(S, R) - D_p| \quad (1)$$

$N_p$(S,R) designates the number of midpoints that fall in the bin p given the values of the positions of the receivers R and the shot positions S.

If $n_R$ designates the number of receivers on the cables, $n_s$ the number of shot points, $s_n$ the position of shot number n and $r_k$(n) the position of the receiver k at the moment of shot number n, it is easy to calculate $N_p$(S,R):

$$N_p(S, R) = \sum_{n=1}^{n_S} \sum_{k=1}^{n_R} \delta\left(\frac{s_n + r_k(n)}{2} \in B(b_p, \varepsilon_p)\right) \quad (2)$$

where:

δ(.) is a function equal to 1 if the condition inside the parentheses is met, or 0 if not;

$B(b_p, \epsilon_p)$ is the topological ball representing the bin p near the midpoint of position $b_p$.

Given that the positions of the reception points $r_k(n)$ are known, one can also write:

$$N_p(S, R) = \sum_{n=1}^{n_S} \sum_{k=1}^{n_R} \delta(s_n \in B(2 \cdot b_p - r_k(n), 2 \cdot \epsilon_p))$$

By convention, we use the following simplified notation:

$$N_p(S, R) = E\left[\frac{S+R}{2} \in B(b_p, \epsilon_p)\right]$$

In effect, the number of points falling in the bin p amounts to calculating the average probability that the midpoints belong to the corresponding topological ball, weighted by the distribution of the positions of the receivers and the shot points. The notation $(S+R)/2$ is slightly improper inasmuch as it does not, strictly speaking, involve simple addition, but involves calculating $n_S \times n_R$ midpoints. We use this notation hereafter to simplify the discussion.

We assume that the preplanning phase of the seismic study has led to the definition of a sequence of shot points such that, in the absence of currents, the requested coverage $D_p$ is achieved for each bin. The reference shot sequence, denoted $S^{ref}$, is made up of a set of reference shot positions $s_n^{ref}$. The positioning of the receivers in the absence of currents, denoted $R^{ref}=R(C=0)$, is made up of a set of reception points $r_k(n)^{ref}$. In the stationary case (patch), these reception points no longer depend on the moment of the shot: $r_k(n)^{ref}=r_k^{ref}$.

Therefore:

$$\forall\, p, N_p(S^{ref}, R^{ref}) = \sum_{n=1}^{n_S} \sum_{k=1}^{n_R} \delta\left(\frac{s_n^{ref} + r_k^{ref}}{2} \in B(b_p, \epsilon_p)\right) = D_p$$

Thus, the metric is minimized and is equal to 0 when:

$$\hat{S}_0 = S^{ref} = \underset{S}{\mathrm{argmin}}\, E[M(S, R) \mid R^{ref}].$$

In the presence of a current, the positions of the receivers are no longer ideal and move away from the reference positions.

Here, we use the hypothesis of replacing the mathematical expectation by the averaged instantaneous value over the reception points. This makes it possible to derive a simple and manageable algorithm, since the shot points can be estimated at each moment without needing full knowledge of the future positions of the receivers up to the end of the study (which, inter alia, requires complete and unlimited knowledge of the currents and the behavior of the drones). It should be noted that this hypothesis is for simplification purposes and may lead to a non-optimal optimization.

In other words, with the above notations, instead of looking at $$E\left[\frac{S+R}{2} \in B(b_p, \epsilon_p)\right],$$

we consider the probability that $$\frac{S_t + E_t[R]}{2} \in B(b_p, \epsilon_p),$$

where $E_t[R]$ is the instantaneous average of the positions of the receivers, and $S_t$ is the instantaneous position of the shot point at the time t.

By using the detailed notation with the indices of the shot points discretized over time (2), this amounts to inverting the function δ(.) and the sum relative to the indices of the receivers. For each shot point number n, we are then interested in:

$$\delta\left(\frac{S_n + \overline{r_n}}{2} \in B(b_p, \epsilon_p)\right) = \delta(s_n \in B(2 \cdot b_p - \overline{r_k}, 2 \cdot \epsilon_p)) \quad (3)$$

where the geometric center of the set of cables at the moment of shot number n is denoted:

$$\overline{r_n} = \frac{1}{n_R} \sum_{k=1}^{n_R} r_k(n)$$

Given that the reference sequence that minimizes the metric in the absence of current is known, the principle is to come as close as possible to that optimal solution for each term of the sum, i.e., at each shot moment. By using the formula (3) for the reference points, and by using the invariance of the points $b_p$ relative to shot number n, the algorithm thus proposes estimating the shot positions as follows:

$$\hat{S}_n = s_n^{ref} + \overline{r^{ref}} - \overline{r_n} = s_n^{ref} - (\overline{r_n} - \overline{r^{ref}})$$

where the geometric center of the reference reception points is denoted:

$$\overline{r^{ref}} = \frac{1}{n_R} \sum_{k=1}^{n_R} r_k^{ref}$$

The term $\overline{r_n} - \overline{r^{ref}}$ represents the position deviation from the center of the receivers between the actual case (in general, in the presence of a current) and the ideal case (the absence of current).

The algorithm thus consists of estimating and compensating the average drift of the cables relative to the reference positions, primarily due to the current and the navigation capacities of the drones. One thus obviously arrives at the algorithm example described in the case of shots orthogonal to the cables.

This algorithm has shown performances close to the optimal solution in realistic cases of current conditions for typical seismic studies. This can be explained as follows.

In the case of a variable, but homogenous current over the expanse of the cables, the cables remain parallel to each other. In the presence of a variable current whereof the direction does not change, the navigation of the drones makes it possible (within a certain speed limit) to remain precisely at the desired location and not to move away from the reference points. In the presence of a variable current including a non-negligible circular current (for example, a tidal current), two potential effects must be anticipated on the cables:

The cables drift relative to the reference positions. In the presence of a homogenous current, the cables all move by a translation vector that we denote d(t) (complex number). In theory, the norm of the translation vector is cyclic (typically, in the presence of a strong tidal current, a sinusoid with a period equal to that of the local tide) and the direction of the translation vector is perpendicular to the direction of the average current. In practice, the translation vector is more random, and its behavior is dictated by the variations of the current and the navigation of the drones.

The azimuths of the cable periodically oscillate around the barycenter of the receivers. The azimuth of the cables is denoted α(t) (real number comprised between −π and +π). In theory, the oscillation of the cables is regular and periodic (typically, in the presence of a strong tidal current, a sinusoid with a period equal to that of the local tide). In practice, the oscillation of the azimuth of the cables is more random, and its behavior is dictated by the variations of the current and the navigation of the drones.

Thus, the position of the receivers at the moment $t_n$ of shot number n may be formulated as follows:

$$r_k(n) = (r_k^{ref} - \overline{r^{ref}}) \cdot e^{j\alpha(t_n)} + \overline{r^{ref}} + d(t_n)$$

where j represents the unitary imaginary complex number.

In the presence of the translational movement only, it is obvious to see that the algorithm leads to an optimal solution. In fact, all of the reception points translate uniformly from the same vector:

$$r_k(n) = r_k^{ref} + d(t_n)$$

The drift due to the current is perfectly estimated, since:

$$\overline{r_n} - \overline{r^{ref}} = \left(\frac{1}{n_R}\sum_{k=1}^{n_R} r_k(n)\right) - \overline{r^{ref}}$$
$$= \left(\frac{1}{n_R} \cdot \sum_{k=1}^{n_R} r_k^{ref} + d(t_n)\right) - \overline{r^{ref}}$$
$$= \left(\overline{r^{ref}} + \frac{1}{n_R} \cdot n_R \cdot d(t_n)\right) - \overline{r^{ref}}$$
$$= d(t_n)$$

And the estimate of the shot points perfectly compensates the offset such that the midpoints are at the same location as the reference midpoints (as described in the example of the orthogonal shot).

In case of pure rotation of the cables, the estimate of the offset is also perfect, since the center of the receivers is invariable in rotation:

$$\overline{r_n} = \frac{1}{n_R}\sum_{k=1}^{n_R} r_k(n)$$
$$= \frac{1}{n_R}\sum_{k=1}^{n_R}(r_k^{ref} - \overline{r^{ref}}) \cdot e^{j\alpha(t_n)} + \overline{r^{ref}}$$
$$= \overline{r^{ref}}$$

However, the midpoints are no longer all at the same location as the reference midpoints. Simulations have shown that the algorithm yields coverage results close to the coverage obtained with the reference points, in particular when the characteristics of the study are such that the oscillations of the azimuth of the cables are sufficiently averaged. This is explained by the fact that, even if the midpoints do not all follow the same location as the reference midpoints, they provide an average thereof.

Thus, when the cables are translated and rotated, the algorithm precisely estimates the offset of the cables relative to the current by considering the position of the barycenter of the cables, and the algorithm compensates the offset of the cables on average for the coverage of the midpoints.

In the case of a non-homogenous current, the algorithm is still valid and the results may be extended: the geometric barycenter of the receivers makes it possible to estimate the average position of the receivers, and therefore to concentrate the midpoints around the reference midpoints on average.

The same type of reasoning may be used to derive a simple optimization algorithm for other criteria, such as the distribution of the offsets or azimuth.

For pragmatic implementation reasons, several positions of the shot points may be calculated simultaneously ("in grouped shot"). In this way, the positions of the shot points are not necessarily calculated one by one just before shooting. In the example of orthogonal shots, it is for example possible to calculate whole shot lines.

This method in no way deteriorates the performance of the optimization inasmuch as the future knowledge of the currents and the positions of the receivers allows it. On the contrary, if the knowledge of the future positions of the receivers is precise, this opens the way to more complete and global optimization than that derived from the simplified hypothesis described above.

One example of a system architecture is now described, once again referring to FIG. 1, which shows the marine seismic acquisition system 10.

In FIG. 1, the cables 110 are kept in position by drones 102. The source-boat 109 moves the seismic source 107 according to the explanations provided above. FIG. 1 also shows a master boat 111 that is used to coordinate the operations (it may also play a role in the launch, recovery, and maintenance operations for the components of the system 10). The architecture may be more or less centralized; for example, the performance of the command and control functions may be more or less geographically delocalized (on the drones 102, the master boat 111, or the source-boat 109).

In one example, the drones 102 and the source-boat 109 send the master boat 111 all of the information necessary to carry out the quality control functions (navigation and seismic), and therefore in particular the positioning information. All of this information is centralized onboard the master boat 111 by a controller or computer (e.g., electronic board). The desired shot positions are then calculated according to the selected optimization algorithm and using the data supplied by the quality control (QC) tools installed onboard the master boat 111. The new shot positions are sent to the source-boat 109. The source-boat 109 moves the seismic source 107 following a route so as to best comply with the desired shot points. The actual positions of the shots are sent in real time and taken into account (by the quality tools) during the next iteration.

Of course, the invention is not limited to the examples and the embodiment described and shown, but on the contrary is open to many alternatives accessible to those skilled in the art.

What is claimed is:

1. An acquisition method of seismic data relative to an area of the subsoil, wherein:
- at least one seismic source is moved and seismic waves are emitted in successive shot positions of the source so as to illuminate said area of the subsoil; and
- the signals resulting from those emissions are picked up using a set of cables having a substantially zero buoyancy and provided with receivers;
- the cables having a substantially zero speed or a speed substantially slower than that of the source in the terrestrial reference frame; and
- said successive shot positions being determined as a function of the position of the receivers relative to the terrestrial reference frame to optimize at least one quality criterion relating to the set of seismic signals acquired by the receivers in respect of said area.

2. The method according to claim 1, wherein the shot positions are calculated one by one.

3. The method according to claim 1, wherein the shot positions are calculated in a grouped shot.

4. The method according to claim 1, wherein the shot positions are adjusted within a predetermined interval range between consecutive shot positions.

5. The method according to claim 1, wherein the positions of the receivers are determined from the absolute positions of the ends of the cables obtained using GPS antennas and relative positions of the receivers with respect to said ends obtained using acoustic triangulation networks installed in the cables.

6. The method according to claim 5, wherein the ends of the cables are provided with drones moving the cables while keeping them under tension, the acoustic triangulation networks comprising acoustic positioning units installed under the drones.

7. The method according to claim 1, wherein the shot positions of the seismic source are determined as a function of a provided reference position of the receivers and the calculation of a drift of the seismic cables by comparing the actual position of the receivers to the reference position of the receivers.

8. The method according to claim 1, wherein the shot positions follow at least one shot line.

9. The method according to claim 8, wherein the arrangement of the shot lines is modified relative to the initial arrangement.

10. The method according to claim 1, wherein the quality criterion is chosen from among a criterion relative to compliance with the geometry of the midpoints, to compliance with a regular distribution of the offsets or the azimuths, or a composite criterion.

11. A marine seismic acquisition system suitable for the acquisition of seismic data relative to an area of the subsoil comprising:
- at least one seismic source is moved and seismic waves are emitted in successive shot positions of the source so as to illuminate said area of the subsoil; and
- the signals resulting from those emissions are picked up using a set of cables having a substantially zero buoyancy and provided with receivers;
- the cables having a substantially zero speed or a speed substantially slower than that of the source in the terrestrial reference frame; and
- said successive shot positions being determined as a function of the position of the receivers relative to the terrestrial reference frame to optimize at least one quality criterion relating to the set of seismic signals acquired by the receivers in respect of said area.

12. The system according to claim 11, further comprising:
- a source boat suitable for moving at least one seismic source, the seismic source being adapted to emit seismic waves,
- a set of cables having a substantially zero buoyancy and provided with receivers, the ends of the cables being provided with drones suitable for keeping the cables at a speed in the terrestrial reference frame of substantially zero or substantially lower than that of the source, and
- a master boat adapted to receive information from the drones on the position of the receivers relative to the terrestrial reference frame, determine said successive shot positions as a function of the position of the receivers relative to the terrestrial reference frame to optimize said at least one quality criterion, and send said successive shot positions to the source boat.

* * * * *